Aug. 12, 1924.
R. L. THOMAS
1,504,530
EXPANSIBLE EGG CASE AND THE LIKE
Filed Aug. 23, 1923
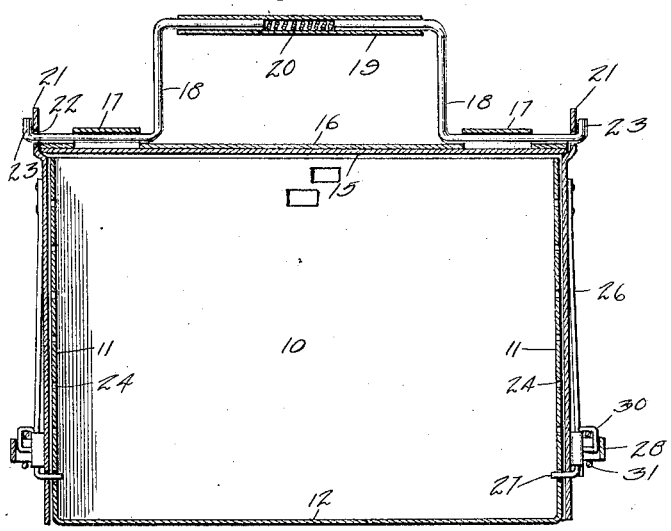
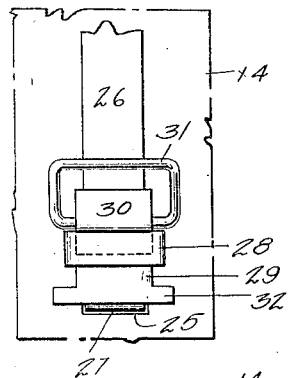
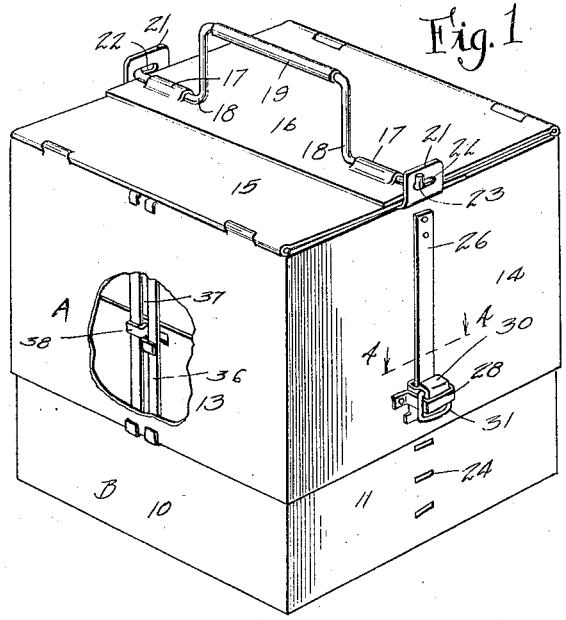
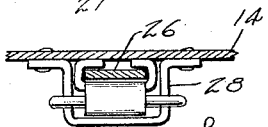
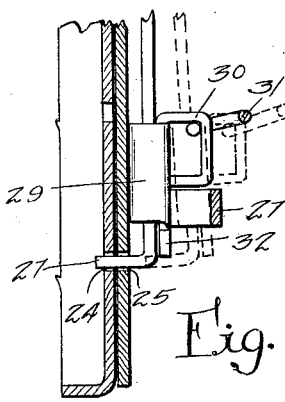
Inventor
Ruliff L. Thomas
By Bair & Freeman
Attys
Witness
Lynn Latta Patented Aug. 12, 1924.

1,504,530

UNITED STATES PATENT OFFICE.

RULIFF L. THOMAS, OF MILFORD, MISSOURI.

EXPANSIBLE EGG CASE AND THE LIKE.

Application filed August 23, 1923. Serial No. 658,903.

*To all whom it may concern:*

Be it known that I, RULIFF L. THOMAS, a citizen of the United States, and a resident of Milford, in the county of Barton and State of Missouri, have invented a certain new and useful Expansible Egg Case and the like, of which the following is a specification.

The object of my invention is to provide an expansible egg case of simple, durable and comparatively inexpensive construction.

More particularly, my invention relates to a pair of telescoping container members arranged to be moved relative to each other and capable of being locked in various positions so that the size of the container may be varied in height as desired.

Still a further object is to provide novel means for locking the two container members relative to each other and for positively holding them in locked position.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my expansible case showing it locked in one of its adjusted positions.

Figure 2 is a central, sectional view through the case.

Figure 3 is a detail, view of the locking means for holding the two container members together.

Figure 4 is a detail, sectional view taken on line 4—4 of Figure 1.

Figure 5 is a detail, vertical, sectional view through the locking connection, one position of the parts being shown in dotted lines.

In the accompanying drawings I have used the reference characters A and B to denote generally two container members arranged telescopically. The container member B is arranged with two side walls 10 and two end walls 11.

A bottom 12 is provided for the container B. The container B is open at its top. The container A is formed with two side walls 13 and two end walls 14.

The container A is provided with a pair of hinged cover members 15 and 16. The cover member 16 is formed with a pair of loops 17 for receiving the handle elements 18. The handle elements 18 are crank shaped and are connected together at their upper inner ends by means of a sleeve 19.

A spring 20 within the sleeve 19 tends to normally hold the crank handle elements 18 in one of their positions.

The end walls 14 of the container member A is formed with a pair of upwardly extending ears 21 having elongated horizontal slots 22 therein.

The outer free ends of the crank handle elements 18 are provided with a portion 23 arranged at right angles to the portion of the handle elements extended through the loops 17. The right angle portions 23 of the handle elements 18 are capable of being projected through the slots 22 when the entire handle is arranged so that it lays upon the cover member 16.

The handle elements may be disengaged by moving the crank shaped portions 18 toward each other against the action of the spring 20 at which time the right angle portions 23 will have been moved to position where they will no longer engage the ears 21.

From the construction of the parts just described it will be seen that I provide a combined handle and locking member for the container member A.

In order to lock the container member A relative to the container member B, I provide a number of spaced slots 24 on the end walls 11 of the container B.

A slot 25 is arranged in each of the end walls 14 of the container A.

Secured to the end walls 14 of the container A are the strap members 26 which have their lower ends inturned, as at 27, so that the inturned portion 27 may extend through the opening 25 and any one of the openings 24 in the end walls of the containers.

A guide loop 28 is formed on each of the end walls 14 and extends around each of the strap members 26. The sliding loop member 29 is mounted on each of the strap members 26 and is arranged with a loop 30 formed integral therewith.

A ring 31 is secured in the loop 30. The lower end of the loop 29 is formed with a pair of outwardly extending shoulders 32 for limiting the sliding movement of the loop 29 relative to the strap members 26.

The shoulders 32 slide against the lower edge of the guide loop 28. The loop portion 30 formed on the loop 29 is designed to be received within the guide loop 28 when the portion 27 of the strap 26 is in its operative position as shown in Figure 4 of the drawings.

The loop members 29 and 30 are raised somewhat until the loop member 30 clears the guide members 28 at which time the guide 28 may be swung to the position shown in dotted lines in Figure 5 of the drawings. When in this position, the container member will be disengaged and will be possible to slide one of them relative to the other as desired.

The link 31 upon the loop 29 is designed to hang down and around the guide loop 28, as clearly shown in Figure 1 of the drawings. The link 31 will prevent any possibility of the loop members 29 and 30 from being accidentally moved out of the guide member 28 and permitting the strap member 26 to become disengaged.

The opening 25 may be brought to register with any one of the openings 24 and this arrangement makes it possible to make a case of various heights.

In order to secure the sides together and at the same time permit the member A to slide relative to the member B, I provide the strips 36 which are fastened to the member A by bending over the ends and welding, as at 36ª. The strips 36 are spaced to form slots 37.

The tongues 38 are cut out of the sides of the member B, extended through the slots 37, and thence bent over to engage the strips 36. The strips 36 are spaced away slightly from the inner side of the member A so as to make room for the bent over portions of the tongues 38. The lower ends of the strips 36 will form stops to limit the downward movement of the member B.

The parts just described will also function to secure the sides of the members A and B together.

The case may have fillers placed therein for use when carrying eggs and by shifting the position of the members A and B relative to each other, I am able to place different numbers of fillers within the entire case.

It will also be seen that my device is very convenient for the shipping of films and it can be adjusted so that various numbers of films may be placed therein.

Some changes may be made in the construction and arrangement of the various parts of my invention, without departing from the real spirit and purpose of my invention, and it is my intention to cover by my claims any modified forms of structure or use of mechanical equivalents, which may be reasonably included within their scope.

I claim as my invention:

1. In a device of the class described a pair of telescoping members arranged to form a container, means for locking said members relative to each other for forming a container of various heights, said last means including strap members on the sides of one of said members having parts adapted to project into the sides of the other of said members and means for locking said strap members against accidental movement.

2. In a device of the class described a pair of telescoping members arranged to form a container, a strap member secured to one of said members, one of said members having a plurality of spaced openings therein, the other of said members having an opening therein, said strap member being extended through the opening in one of said members and any one of the plurality of openings in the other of said members for locking the members relative to each other as specified.

3. In a device of the class described a pair of telescoping members arranged to form a container, means for locking said members relative to each other for forming a container of various heights, said last means including strap member on the sides of one of said members having parts adapted to project into openings formed in the sides of the other of said members, said last means being capable of being sprung to position where the members will be free to move relative to each other and guide loops on said member having the strap members thereon, extending around the strap members for retaining them in operative position.

4. In a device of the class described a pair of telescoping members arranged to form a container, means for locking said members relative to each other for forming a container of various heights, said last means including strap members on the sides of one of said members having parts adapted to project into the sides of the other of said members and a slide loop for holding the strap member in operative position.

5. In a device of the class described, a pair of telescoping members arranged to form a container, means for locking said members relative to each other for forming a container of various heights, said last means including strap members on the sides of one of said members having parts adapted to project into the sides of the other said members, guide loops on the member having the strap members thereon for receiving the strap members and slide loops on said strap members for coacting with the guide loops for the holding the strap members against accidental movement.

Des Moines, Iowa, July 18, 1923.

RULIFF L. THOMAS.